United States Patent
Patel et al.

[11] Patent Number: 6,163,127
[45] Date of Patent: Dec. 19, 2000

[54] SYSTEM AND METHOD FOR CONTROLLING A POSITION SENSORLESS PERMANENT MAGNET MOTOR

[75] Inventors: Nitinkumar Ratilal Patel, Buena Park; Thomas P. O'Meara, Redondo Beach, both of Calif.

[73] Assignee: General Motors Corporation, Detroit, Mich.

[21] Appl. No.: 09/444,437

[22] Filed: Nov. 22, 1999

[51] Int. Cl.[7] ...................................................... H02P 7/36
[52] U.S. Cl. ........................... 318/700; 318/705; 318/715
[58] Field of Search ................................. 318/700, 705, 318/715, 808, 809

[56] References Cited

U.S. PATENT DOCUMENTS

| | | | |
|---|---|---|---|
| 5,559,419 | 9/1996 | Jansen et al. | 318/808 |
| 5,565,752 | 10/1996 | Jansen et al. | 318/807 |
| 5,585,709 | 12/1996 | Jansen et al. | 318/807 |
| 5,689,165 | 11/1997 | Jones et al. | 318/701 |
| 5,880,550 | 3/1999 | Fukao et al. | 310/179 |
| 5,903,129 | 5/1999 | Okuno et al. | 318/721 |

OTHER PUBLICATIONS

*Pending U.S. patent application Ser. No. 09/409,890.

*Primary Examiner*—Karen Masih
*Assistant Examiner*—Rita Leykin
*Attorney, Agent, or Firm*—Christopher DeVries

[57] ABSTRACT

A position sensorless interior permanent magnet drive system and methods for use in electric and hybrid electric vehicles. The interior permanent magnet drive system and method use two rotor position estimation techniques for low and high speed operation and an initial rotor magnet polarity detection technique used at stand-still conditions. The use of the two different rotor position estimation techniques in combination enhances system efficiency and accuracy.

10 Claims, 3 Drawing Sheets

SYSTEM AND METHOD FOR CONTROLLING A POSITION SENSORLESS PERMANENT MAGNET MOTOR

BACKGROUND

The present invention relates generally to electric and hybrid electric vehicles, and more particularly, to an improved permanent magnet motor control system for use in electric and hybrid electric vehicles.

The assignee of the present invention designs and develops electric and hybrid electric vehicles. In recent years various techniques have been published in the literature that address position sensorless operation of permanent magnet synchronous motors. Most of these techniques are based on either a fundamental component voltage model of the motor or on the spatial inductance of the salient rotor motor.

Permanent magnet synchronous motors have been considered for electric and hybrid electric vehicle applications because of their high torque to inertia ratio, superior power density and high efficiency. For high performance control applications, permanent magnet drive systems require absolute rotor position and speed signals which can be obtained from rotor position sensors such as resolvers and hall effect sensors mechanically coupled to the rotor shaft of the motor. This coupling as well as electrical connectors and signal wires from the sensor to the controller reduce mechanical robustness of the overall system. This reduction in mechanical robustness and cost of the sensors and electrical interface make elimination of these devices very desirable.

The conventional control techniques described above have limited operational range. The first technique, based on the fundamental component voltage model, cannot be used at or near zero speed operation because it requires integration of the stator voltages which are zero at stand-still and are very small near zero speed. This will cause oscillatory torque during start-up. The second technique based on the spatial information is not efficient in high speed operation because it requires high frequency injection in order to realize the absolute rotor position. This limits the available DC link voltage, which is not desirable in electric and hybrid electric vehicle applications.

It would therefore be desirable to have an improved permanent magnet motor control system for use in electric and hybrid electric vehicles, and the like.

SUMMARY OF THE INVENTION

The present invention provides an improved position sensorless approach for implementing an interior permanent magnet drive system for use in electric and hybrid electric vehicle applications. The interior permanent magnet drive system uses a combination of two rotor position estimation techniques for low and high speed operation in addition to initial rotor magnet polarity detection at stand-still conditions. Combining the two different rotor position estimation techniques enhances system efficiency and accuracy.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
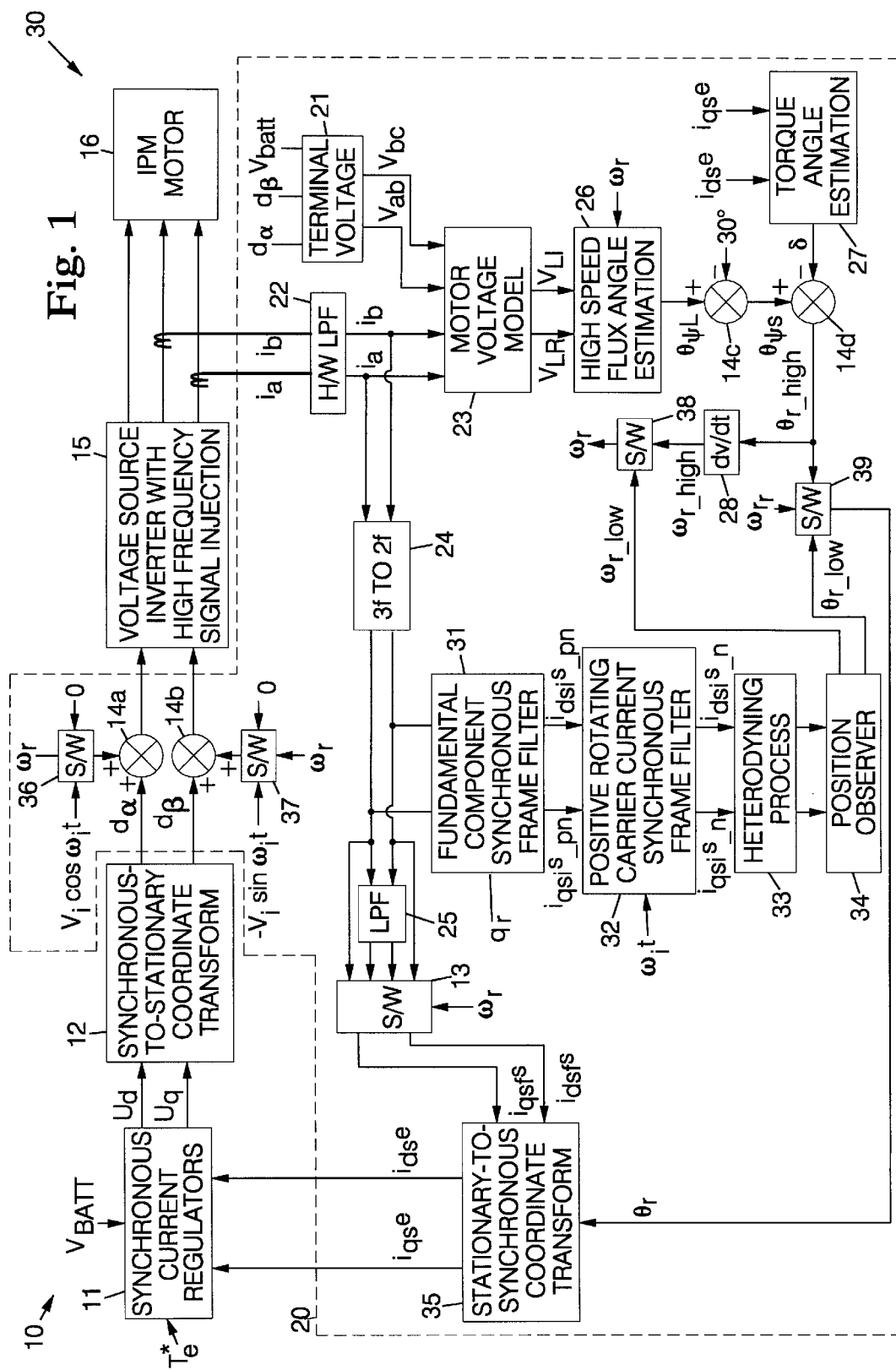
FIG. 1 illustrates a block diagram of an exemplary control system in accordance with the principles of the present invention.

Referring to the drawing figures, FIG. 1 is a block diagram illustrating an exemplary interior permanent magnet motor drive control system 10 in accordance with the principles of the present invention. The present invention provides for a novel position sensorless approach for implementing the interior permanent magnet motor drive control system 10 for electric and hybrid electric vehicle applications. The interior permanent magnet motor drive control system 10 uses a combination of two rotor position estimation techniques for low and high speed operation, respectively, along with initial rotor magnet polarity detection at stand-still conditions. The overall efficiency and accuracy of the control system 10 are enhanced by combining the two different rotor position estimation techniques.

The exemplary interior permanent magnet motor drive control system 10 is used to control operation of an interior permanent magnet motor 16 of an electric vehicle 30. A torque command ($T_e^*$) derived from an accelerator pedal of the electric vehicle 30 is applied to synchronous current regulators 11 along with a voltage ($V_{BATT}$) from electric vehicle propulsion batteries and d and q axis current estimates ($i_{ds}e$, $i_{qs}e$) output by the control system 10. The regulators 11 output d and q axis voltage signals ($U_d$, $U_q$) which are input to a synchronous-to-stationary coordinate transform circuit 12. Output signals generated by the synchronous-to-stationary coordinate transform circuit 12 comprise $\alpha$ and $\beta$ axis duty cycle signals ($d_\alpha$, $d_\beta$) that are added to $\alpha$ and $\beta$ axis balanced high frequency voltage signals derived from software switches (S/W) 13, 36, 37 using first and second adders 14a, 14b. The signals output by the adders 14 are applied to a voltage source inverter 15 having high frequency signal injection. The three phase output of the voltage source inverter 15 is applied to the interior permanent magnet motor 16.

The interior permanent magnet motor drive control system 10 includes a controller 20 that comprises a terminal voltage calculation module 21 (equations 5 and 6 below) that processes the battery voltage signals ($V_{BATT}$) and the $\alpha$ and $\beta$ axis duty cycle signals ($d_\alpha$, $d_\beta$) and outputs machine terminal line—line voltages ($V_{ab}$, $V_{bc}$) that are input to a motor voltage model 23 (equations 7 and 8 below). A hardware (H/W) low pass filter 22 filters two phases of current signals ($i_a$, $i_b$) sensed by current sensors at machine terminals and applies the filtered current signals to the motor voltage model 23. The motor voltage model 23 outputs stator voltages ($V_{LR}$, $V_{LI}$) subtracting voltage drop across stator resistances.

The current signals ($i_a$, $i_b$) output by the low pass filter 22 are processed by a three phase to two phase conversion circuit 24 and are input to a second low pass filter 25 and to a fundamental component synchronous frame filter 31. The fundamental component synchronous frame filter 31 processes the current signals along with the rotor position angle signal ($\theta_r$) to filter out the fundamental frequency of the rotor using a form of a notch filter, converting the signals to stationary frame positive and negative rotating carrier current signals ($i_{qsi}s\_{pnpn}$, $i_{dsi}s\_{pnpn}$). The positive and negative rotating carrier current signals ($i_{qsi}s\_{pnpn}$, $i_{dsi}s\_{pnpn}$) are input to a positive rotating carrier current synchronous frame filter 32 along with an angular position signal ($\omega_i t$) to filter out the injection frequency using a form of a notch filter, to produce stationary frame negative rotating carrier current signals ($i_{qsi}s\_{n_n}$, $i_{dsi}s\_{n_n}$). The negative rotating carrier current signals ($i_{qsi}s\_{n_n}$, $i_{dsi}s\_{n_n}$) are input to a known heterodyning process 33. The heterodyning process 33 supplies input signals to a known position observer 34 that outputs parameter insensitive, zero lag, rotor velocity and position signals ($\omega_{r\_low}$, $\theta_{r\_low}$) and which are input to the software switches 38 and 39, respectively.

The stator voltages ($V_{LR}, V_{LI}$) output by the motor voltage model 23 along with a rotor velocity signal ($\omega_r$), are input to a high speed flux angle estimation module 26. The high speed flux angle estimation module 26 integrates the stator voltages ($V_{LR}, V_{LI}$). The line flux angle estimate ($\theta_{\psi L}$) has a predetermined angle (30°) subtracted from it in a third adder 14c to produce a phase flux angle signal ($\theta_{\psi s}$) which is input to a fourth adder 14d. A load torque angle estimation module 27 processes d and q axis synchronous reference frame current ($i_{ds}e$, $i_{qs}e$) to produce the load torque angle ($\delta$). The third adder 14c subtracts the torque load angle ($\delta$) from the phase flux angle signal ($\theta_{\psi s}$) to produce the high speed rotor position signal ($\theta_{r\_high}$).

The high speed rotor position signal ($\theta_{r\_high}$) is input to the software switch 39 and to a derivative (dv/dt) module 28 which produces a high speed rotor speed signal ($\omega_{r\_high}$). The high speed rotor speed signal ($\omega_{r\_high}$) is applied to the software switch 39. The software switches 38 and 39 output the rotor speed signal ($\omega_r$) and the rotor position angle signal ($\theta_r$), respectively.

The output of the second low pass filter 25 is applied to the software switch 13 along with the rotor speed signal ($\omega_r$). The software switch 13 selects the output of the low pass filter 25 during low speed operation and the unfiltered signals output from block 24 during high speed operation. The software switch 13 outputs fundamental stationary frame current signals ($i_{qsf}s$, $i_{dsf}s$) which are input to a stationary-to-synchronous coordinate transform module 35 along with the rotor position angle signal ($\theta_r$). The stationary-to-synchronous coordinate transform module 35 outputs the d and q axis synchronous reference frame currents ($i_{ds}e$, $i_{qs}e$) which are input to the synchronous current regulators 11.

For low speed operation, the rotor magnetic saliency of the interior permanent magnet motor 16 is used to estimate the absolute rotor position. The motor 16 acts as an electromagnetic resolver and the inverter 15 (power converter) applies carrier frequency voltages to the stator of the motor 16 which produce high frequency currents that vary with rotor position. These currents are then filtered by the fundamental component and positive rotating carrier current synchronous frame filters 31, 32. Negative rotating carrier currents are then processed using the heterodyning process 33 to produce a signal that is approximately proportional to the difference between the actual and estimated rotor position. This signal is then used as an input to a Luenberger style position observer 34, for example, to produce parameter insensitive, zero lag, rotor position signal.

For high speed operation, the stator flux angle estimate ($\theta_{\omega L}$), derived by integrating the stator voltages ($V_{LR}, V_{LI}$), and the torque load angle ($\delta$) are used to estimate the rotor position. This technique works very well at high speed since the back EMF of the motor 16 is of higher amplitude.

Figure 3:
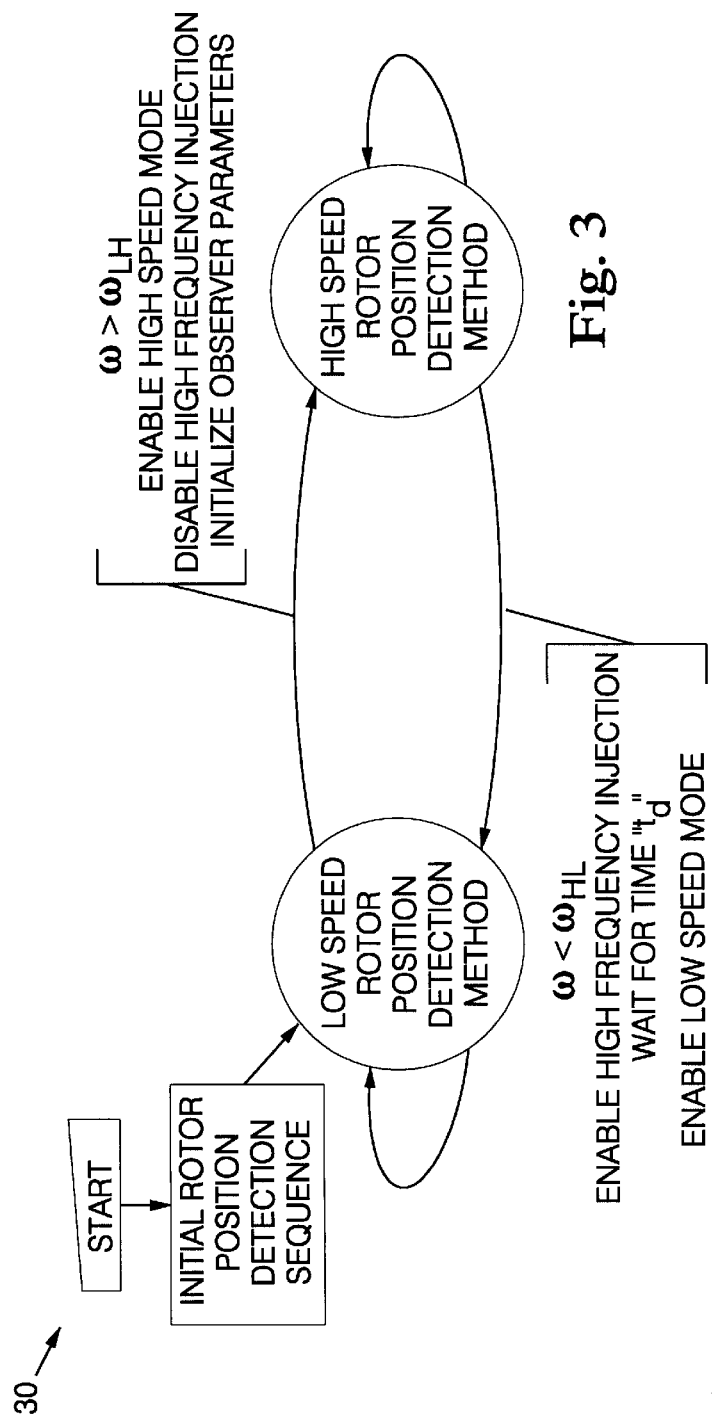
FIG. 3 illustrates a state flow diagram for transition between low and high speed rotor position estimation techniques used in the present invention.

Smooth transition between low and high speed rotor position estimation methods is obtained by using the software switch 13. The switching mechanism implemented by the software switch 13 is as follows. The switching mechanism is illustrated in FIG. 3.

For low speed operation, the rotor magnetic saliency of the interior permanent magnet motor 16 is used to estimate the absolute rotor position. This method utilizes an injected signal at a known frequency to extract information from spatial saliency. The injected signals are balanced stationary frame voltage signals as shown in equation (1) and (2).

$$V_{ds}{}^s = V_i \cos \omega_i t \qquad (1)$$

$$V_{qs}{}^s = -V_i \sin \omega_i t \qquad (2)$$

where, $\omega_i$ is injection frequency in radians/second. Software switches 36 and 37 are controlled to inject the injected signals only upon entry and during the low speed operation as described below, so as not to limit the power available in the stator field coils during high speed operation.

The motor 16 acts as electromagnetic resolver and the power converter applies carrier frequency voltages to the stator which produce high frequency currents that vary with rotor position.

$$i_{ds}{}^s = I_p \sin \omega_i t - I_n \cos(h\theta_r - \omega_i t) \qquad (3)$$

$$i_{qs}{}^s = -I_p \cos \omega_i t - I_n \sin(h\theta_r - \omega_i t) \qquad (4)$$

where, $I_p$ and $I_n$ are positive and negative sequence carrier signal currents, h is a number identifying the harmonic, and $\theta_r$ is the rotor position.

Only the negative component of the high frequency currents contain rotor position information as illustrated in equations (3) and (4). These currents are filtered by the fundamental component and positive rotating carrier current synchronous frame filters 31, 32. Negative rotating carrier currents are then processed with the heterodyning process 33 to produce a signal that is approximately proportional to the difference between actual and estimated rotor position. This signal is then used as input to the Luenberger style position observer 34 to produce parameter insensitive, zero lag, rotor position.

This technique has two important features. First, its steady state tracking ability is not dependent on the parameters of the motor 16. The term $I_n$ is dependent on the inductance of the motor 16. However, this term is only a scaling term and does not effect the accuracy of the position estimate since its spatial angle is being tracked not the amplitude. Second, the magnitude of In is also independent of speed if a linear observer controller is used. This technique cannot differentiate between north and south pole of the magnets. So initial magnet polarity detection is required as discussed herein.

Figure 2:
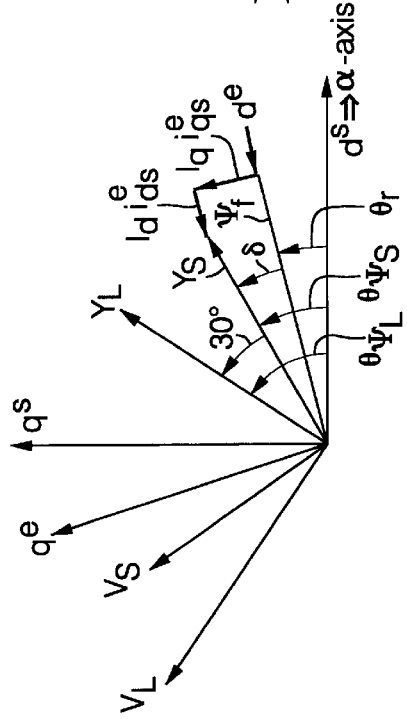
FIG. 2 illustrates a space vector diagram for a permanent magnet motor.

For high speed operation, the back EMF of the motor 16 is utilized to estimate stator flux angle. Stator flux angle can be calculated by integrating the stator voltage behind the stator resistance. FIG. 2 shows a space vector diagram for permanent magnet motor 16 in which $V_s$ is the line to neutral back EMF vector and $V_L$ is the line to line voltage vector.

The line to line flux linkage vector $\omega_L$ is obtained by integrating $V_L$. The line to line EMF vector $V_L$ leads $V_s$ by 30° in angular space. Thus, by calculating line to line flux vector $\omega_L$, the stator flux vector $\psi_s$ can be easily derived by subtracting 30° as shown in FIG. 1. Since the motor terminal voltages are very noisy due to pulse width modulated operation, command d and q axis voltages (i.e., α and β axis duty cycle signals) are used to derive line to line machine voltages in the terminal voltage model 21.

$$V_{ab} = V_d\left(d_d - \frac{1}{\sqrt{3}}d_q\right) \quad (5)$$

$$V_{bc} = \frac{2}{\sqrt{3}}V_d d_q \quad (6)$$

where, $d_d$ and $d_q$ are d and q axis duty cycles respectively, and $V_d$ is the DC link voltage. Real and imaginary components of the stator line to line voltage $V_L$ can be expressed as, $$V_{LI}^s = \frac{1}{\sqrt{3}}(V_{ab} + 2V_{bv}) + \sqrt{3}\,R_s I_c \quad (7)$$

$$V_{LR}^s = V_{ab} - R_s(I_a - I_b) \quad (8)$$

where, $R_s$ is stator resistance, $I_a$, $I_b$, and $I_c$ are machine terminal currents. These real and imaginary components of line to line stator voltages are then processed through an integration module 26 comprising the high speed flux angle estimation 26, to calculate real $\omega^s_{LR}$ and imaginary $\psi^s_{LI}$ line to line flux vectors. The integration module 26 comprises cascaded programmable low pass filters, which automatically compensate for 90° phase shift as well as amplitude attenuation introduced by hardware or software filters.

$$\psi_{LI}^s = \int V_{LI}^s dt \quad (9)$$

$$\psi_{LR}^s = \int V_{LI}^s dt \quad (10)$$

The space angle of the line to line flux is, $$\theta_{\psi L} = \tan^{-1}\left[\frac{\psi_{LI}^s}{\psi_{LR}^s}\right] \quad (11)$$

As shown in FIG. 2, the line to line flux vector $\psi_L$ leads the stator phase flux vector $\psi_s$ by 30°. Therefore, the stator flux vector position can be obtained as, $$\theta_{\psi s} = \theta_{\omega L} - 30° \quad (12)$$

The load torque angle $\delta$ can be calculated as, $$\delta = \tan^{-1}\left[\frac{L_q i_{qs}^e}{L_d i_{ds}^e + \Psi_f}\right] \quad (13)$$

where, $L_d$ and $L_q$ are d and q axis inductance values, $\psi_f$ is the flux linkage due to magnets, and $i^e_{ds}$ and $i^e_{qs}$ are d and q axis currents in the synchronous reference frame. Once the load torque angle is available, the rotor position angle can be obtained as, $$\theta_r = \theta_{\psi s} - \delta \quad (14)$$

The back EMF technique works very well at high speed since back EMF of the motor 16 is of higher amplitude.

Each of the two rotor position detection techniques described above has limitations. The low speed injection technique requires high frequency signal injection to realize the rotor position, which limits the available DC link voltage. For electric and hybrid electric vehicles 30, a limitation on the DC link voltage availability is not desirable since it degrades the drive system efficiency near and above the base speed of the motor 16. This technique provides robust performance at and near zero speed. On the other hand, the high speed back EMF technique does not work at and near zero speed since it requires stator voltage information to detect rotor position. At zero speed the stator voltages are zero and near zero speed amplitude of stator voltages are very small compared to the signal to noise ratio. Integration of the noisy signal provides poor rotor position information, which may result in oscillatory output torque. Also near zero speed, the stator resistance drop is dominant so that any variation in stator resistance of the motor 16 adds error in rotor position estimation. Thus, the back EMF technique does not perform very well near zero speed. At high speed this technique provides accurate rotor position information since the amplitude of the stator voltages are higher and also voltage across stator resistance is negligible.

In the sensorless techniques used in the control system 10, advantages of both techniques have been combined. Smooth transition between low and high speed rotor position estimation methods is obtained by using the software switches 13, 36, 37, 38, 39. FIG. 3 shows the mechanism implemented by the software switches 13, 36, 37, 38, 39. FIG. 3 is a state flow diagram showing the transition between low and high speed rotor position estimation techniques.

Figure 4:
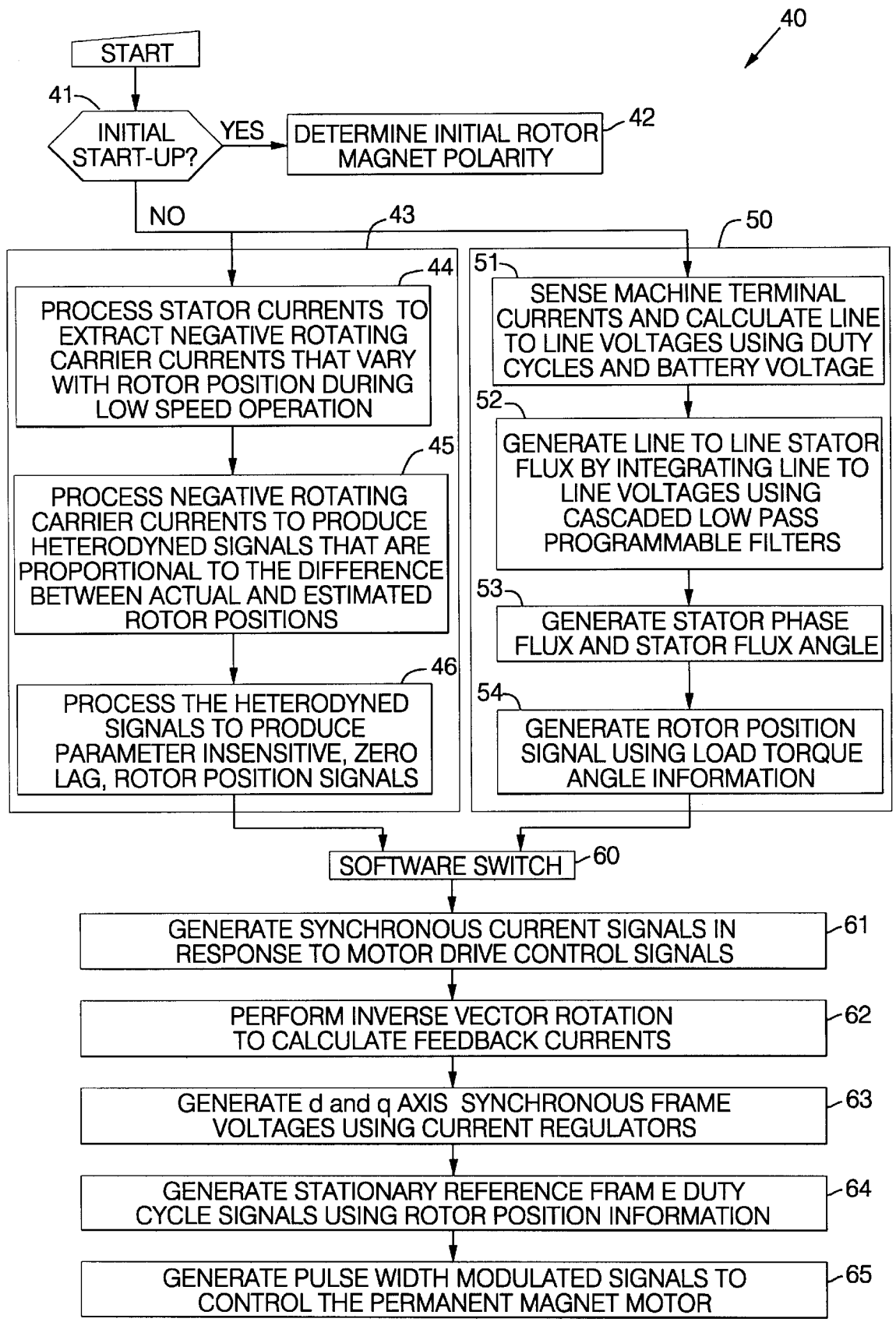
FIG. 4 is a flow diagram illustrating an exemplary control method in accordance with the principles of the present invention.

For the purposes of completeness, FIG. 4 is a flow diagram illustrating an exemplary control method 40 in accordance with the principles of the present invention. The exemplary control method 40 controls a permanent magnet motor 16 having a rotor and a stator and comprises the following steps.

An initial start-up determination 41 is made regarding the control method 40. If it is determined 41 that the method 40 has started up (Yes), then the control method 40 is initialized, and the magnet polarity of the rotor at stand-still conditions of the motor 16 are determined 42. After initialization, or in the event that start-up has previously been done (No), estimates of the rotor position is processed 43 when the motor operates at low speed. This is achieved in the following manner.

Stator currents are processed 44 to extract negative rotating carrier currents that vary with rotor position during low speed operation. Negative rotating carrier currents are processed 45 to produce heterodyned signals that are proportional to the difference between actual and estimated rotor positions. The heterodyned signals are processed 46 to produce parameter insensitive, zero lag, rotor position signals.

Machine (motor 16) terminal currents are sensed and line to line voltages are calculated 51 using duty cycles and battery voltage. Line to line stator flux is generated 52 by integrating the line to line voltages using cascaded low pass programmable filters. The phase flux and flux angle of the stator are then generated 53. A rotor position signal is then generated 54 using load torque angle information for high speed operation.

A selected one of the two rotor position signals are processed using a software switch 60 to generate 61 synchronous current signals. An inverse vector rotation is performed 62 to calculate feedback currents. The d and q axis synchronous frame voltages are generated 63 using current regulators. Stationary reference frame duty cycle signals are generated 64 using rotor position information. Pulse width modulated signals are then generated 65 to control the permanent magnet motor 16.

The present method has been implemented and tested on a 70 KW interior permanent magnet motor test bench to prove out the principles of the present invention. In the reduced to practice embodiment of the control system 10, the high speed rotor position estimation technique is enabled all the time while the low speed injection technique is disabled beyond stator or fundamental frequency of 25 Hz preventing using the DC link voltage due to high frequency injection. The transition from high speed to low speed takes into account that injection is required before the position observer 34 starts estimating the rotor position. Therefore, around a stator or fundamental frequency of 20 Hz electric frequency, the software module enables the high frequency signal injection and then waits until $t_d$ time for the position observer 34 to converge to the correct rotor position, and then switches to low speed mode. The time $t_d$ was determined by experiment. Rotor polarity detection is only required at the initial stage. Once the magnet polarity is detected, then even when the vehicle 30 completely stops, rotor position observer 34 remembers the last rotor position. In case of a processor reset, magnet polarity detection operation is regenerated.

Compared to conventional approaches, the present invention does not require a position sensor. Reduced mechanical and electrical interface costs are provided by the present invention. A reduced overall drive production cost is also achieved using the present invention. The present invention also has improved reliability.

Thus, an improved permanent magnet motor control system for use in electric and hybrid electric vehicles, and the like has been disclosed. It is to be understood that the above-described embodiment is merely illustrative of one of the many specific embodiments that represent applications of the principles of the present invention. Clearly, numerous and other arrangements can be readily devised by those skilled in the art without departing from the scope of the invention.

What is claimed is:

1. A control system for controlling a permanent magnet motor having a rotor and a stator, comprising:

synchronous current regulation apparatus coupled to a source of power for receiving a motor drive control signal;

synchronous-to stationary coordinate transform apparatus for transforming output voltage signals derived from the synchronous current regulation apparatus into stationary voltage signals;

a voltage source inverter for processing the stationary frame duty cycle signals derived from the synchronous-to stationary coordinate transform apparatus to control the permanent magnet motor; and a controller for determining the magnetic saliency of the rotor of the interior permanent magnet motor to estimate the absolute position of the rotor when the rotor operates at low speed, and for processing an estimate of the stator flux angle and the torque load angle to estimate the position of the rotor when the rotor operates at high speed.

2. The control system recited in claim 1 wherein the controller further comprises a module for determining the magnet polarity of the rotor at stand-still conditions of the motor.

3. The control system recited in claim 1 wherein the controller further comprises:

fundamental component and positive rotating carrier current synchronous frame filters for filtering high frequency currents supplied to the motor during low speed operation that vary with rotor position;

a heterodyning module for processing negative rotating carrier currents to produce signals that are proportional to the difference between the actual and estimated rotor position; and a position observer for processing output signals from the heterodyning module to produce parameter insensitive, zero lag, rotor position signals.

4. The control system recited in claim 1 wherein stator flux angle estimate is achieved by integrating stator voltages.

5. A method for controlling a permanent magnet motor having a rotor and a stator, comprising the steps of:

generating an estimate of the rotor position when the rotor operates at low speed;

processing an estimate of the stator flux angle and the torque load angle to generate an estimated rotor position signal when the rotor operates at high speed;

processing a selected one of the two rotor position signals to generate synchronous current signals;

calculating feedback currents by performing an inverse vector rotation;

generating d and q axis synchronous frame voltages;

generating stationary reference frame duty cycle signals using rotor position information; and generating pulse width modulated signals to control the permanent magnet motor.

6. The method recited in claim 5 wherein the estimated rotor position signal is determined by:

processing stator currents to extract negative rotating carrier currents that vary with rotor position during low speed operation;

processing negative rotating carrier currents to produce heterodyned signals that are proportional to the difference between actual and estimated rotor positions; and processing the heterodyned signals to produce parameter insensitive, zero lag, rotor position signals.

7. The method recited in claim 5 wherein the rotor position is determined by:

sensing terminal currents and calculating 51 line to line voltages using duty cycles and battery voltage;

generating line to line stator flux by integrating the line to line voltages;

generating the phase flux and flux angle of the stator; and generating a rotor position signal using load torque angle information.

8. The method recited in claim 5 further comprising the step of initializing the method by determining the magnet polarity of the rotor at stand-still conditions of the motor.

9. A method for controlling a permanent magnet motor having a rotor and a stator, comprising the steps of:

generating an estimate of the rotor position when the rotor operates at low speed by:

processing stator currents to extract negative rotating carrier currents that vary with rotor position during low speed operation;

processing negative rotating carrier currents to produce heterodyned signals that are proportional to the difference between actual and estimated rotor positions; and processing the heterodyned signals to produce parameter insensitive, zero lag, rotor position signals.

processing an estimate of the stator flux angle and the torque load angle to generate an estimated rotor position signal when the rotor operates at high speed by:

sensing terminal currents and calculating line to line voltages using duty cycles and battery voltage;

generating line to line stator flux by integrating the line to line voltages;

generating the phase flux and flux angle of the stator;

generating a rotor position signal using load torque angle information;

processing a selected one of the two rotor position signals to generate synchronous current signals;

calculating feedback currents by performing an inverse vector rotation;

generating d and q axis synchronous frame voltages;

generating stationary reference frame duty cycle signals using rotor position information; and generating pulse width modulated signals to control the permanent magnet motor.

10. The method recited in claim 9 further comprising the step of initializing the method by determining the magnet polarity of the rotor at stand-still conditions of the motor.

* * * * *